US009098475B2

(12) United States Patent
Barnes et al.

(10) Patent No.: US 9,098,475 B2
(45) Date of Patent: Aug. 4, 2015

(54) APPARATUS AND METHOD FOR GENERATING REUSABLE COMPOSITE COMPONENTS DURING DYNAMIC DOCUMENT CONSTRUCTION

(75) Inventors: Eric S. Barnes, Manhattan Beach, CA (US); Michael C. Lacagnina, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 3874 days.

(21) Appl. No.: 10/644,468

(22) Filed: Aug. 20, 2003

(65) Prior Publication Data

US 2005/0044494 A1    Feb. 24, 2005

(51) Int. Cl.
*G06F 17/22*    (2006.01)
*G06F 17/21*    (2006.01)

(52) U.S. Cl.
CPC .......... *G06F 17/2229* (2013.01); *G06F 17/212* (2013.01)

(58) Field of Classification Search
USPC ......... 358/1.18; 715/530, 222–225, 243, 247, 715/253
See application file for complete search history.

(56) References Cited

U.S. PATENT DOCUMENTS

| | | | |
|---|---|---|---|
| 5,655,130 A | | 8/1997 | Dodge et al. |
| 5,850,490 A | * | 12/1998 | Johnson .................. 382/306 |
| 5,870,769 A | * | 2/1999 | Freund ..................... 715/205 |
| 5,895,477 A | | 4/1999 | On et al. |
| 5,930,813 A | * | 7/1999 | Padgett et al. ............ 715/207 |
| 5,956,737 A | * | 9/1999 | King et al. ................ 715/202 |

(Continued)

FOREIGN PATENT DOCUMENTS

WO    WO02091163    11/2002

OTHER PUBLICATIONS

U.S. Appl. No. 10/342,610, filed Jan. 15, 2003, entitled "Apparatus and Method for Managing and Using Reusable Document Components During the Process of Dynamic Document Construction" by Jay A. Glaspy Jr., et al.

(Continued)

*Primary Examiner* — Hilina K Demeter

(57) ABSTRACT

A method for creating reusable composite components from interpreted pages of rendered document during dynamic document construction involves first obtaining a list of document components from the page and identifying any non-cached components. The individual reusable document components (RDCs) are cached having been rendered to their respective bounding box dimensions. These RDCs are then permuted into combinations of RDCs and each composite RDC is cached rendered relative to each other in a bounding box of sufficient size to adequately contain the combination. Then, combining RDCs to form composite reusable underlays RULs and caching the composite RULs rendered to full-page size. Any portion of each RDC of each composite RUL falling outside the boundary of RULs full-page size is clipped. If a method renders pages having a combination of reusable components and non-cached components, the first step assesses the page for the possibility of having an underlay-overlay pair. Then a cache of RULs is searched for underlays having the needed RDCs. If the correct RUL is not found in cache then generating a RUL from the page's RDCs and caching the new RUL rendered to full-page size. A full-page size overlay is rendered having the non-cached components. Lastly, given the overlay and given the correct underlay is found in cache then retrieving the underlay and rendering the page therefrom.

11 Claims, 7 Drawing Sheets

(56) References Cited

U.S. PATENT DOCUMENTS

| | | | |
|---|---|---|---|
| 6,014,224 A | 1/2000 | Mitani | |
| 6,049,390 A * | 4/2000 | Notredame et al. | 358/1.15 |
| 6,065,026 A | 5/2000 | Cornelia et al. | |
| 6,073,148 A * | 6/2000 | Rowe et al. | 715/205 |
| 6,134,018 A | 10/2000 | Dziesietnik et al. | |
| 6,256,108 B1 | 7/2001 | Dziesietnik et al. | |
| 6,272,252 B1 * | 8/2001 | Eldridge et al. | 382/232 |
| 6,307,977 B1 * | 10/2001 | Eldridge et al. | 382/245 |
| 6,317,222 B1 * | 11/2001 | Eldridge et al. | 358/2.1 |
| 6,397,217 B1 | 5/2002 | Melbin | |
| 6,441,919 B1 | 8/2002 | Parker et al. | |
| 6,523,174 B1 * | 2/2003 | Gould et al. | 717/162 |
| 6,562,077 B2 * | 5/2003 | Bobrow et al. | 715/204 |
| 6,683,619 B1 * | 1/2004 | Samra | 345/619 |
| 6,728,762 B1 * | 4/2004 | Estrada et al. | 709/218 |
| 6,744,452 B1 * | 6/2004 | McBrearty et al. | 715/853 |
| 6,765,689 B1 * | 7/2004 | Benstein | 358/1.18 |
| 6,775,781 B1 | 8/2004 | Phillips et al. | |
| 6,922,784 B2 | 7/2005 | Phillips et al. | |
| 6,922,807 B1 * | 7/2005 | Miyata | 715/203 |
| 6,948,115 B2 * | 9/2005 | Aizikowitz et al. | 715/202 |
| 6,992,786 B1 * | 1/2006 | Breding et al. | 358/1.15 |
| 7,146,563 B2 * | 12/2006 | Hesmer et al. | 715/223 |
| 7,194,683 B2 * | 3/2007 | Hind et al. | 715/235 |
| 7,233,407 B1 * | 6/2007 | Simchik et al. | 358/1.15 |
| 2002/0078097 A1 * | 6/2002 | Chen et al. | 707/517 |
| 2002/0165883 A1 * | 11/2002 | Sans et al. | 707/530 |
| 2003/0007014 A1 * | 1/2003 | Suppan et al. | 345/853 |
| 2003/0086098 A1 * | 5/2003 | Sesek et al. | 358/1.1 |
| 2003/0159112 A1 * | 8/2003 | Fry | 715/513 |
| 2004/0123244 A1 * | 6/2004 | Campbell et al. | 715/517 |
| 2004/0141197 A1 * | 7/2004 | Gauthier | 358/1.11 |
| 2004/0216048 A1 * | 10/2004 | Brown et al. | 715/530 |
| 2004/0237030 A1 * | 11/2004 | Malkin | 715/505 |
| 2005/0044494 A1 | 2/2005 | Barnes et al. | |
| 2005/0223320 A1 * | 10/2005 | Brintzenhofe et al. | 715/517 |
| 2005/0283722 A1 | 12/2005 | Warmus et al. | |
| 2006/0036612 A1 * | 2/2006 | Harrop et al. | 707/100 |
| 2006/0129905 A1 * | 6/2006 | Spork | 715/500 |

OTHER PUBLICATIONS

Fiala Z.; Hinz M.; Meissner K.;Wehner F.; A component-based approach for adaptive dynamic web documents; 12$^{th}$ International world Wide Web Conference (WWW 2003); May 2003 XP002459368 Budapest May 20-24, 2003.

Fiala Z.; Hinz M.; Meissner K.;Wehner F.; A component-based approach for adaptive dynamic web documents; Journal of Web engineering, vol. 2, No. 2/3, Sep. 2003 ; pp. 58-73; XP002459369; Rinton Press.

Office Action for European Counterpart (EP 04 01 9752) dated Aug. 23, 2010.

* cited by examiner

APPARATUS AND METHOD FOR GENERATING REUSABLE COMPOSITE COMPONENTS DURING DYNAMIC DOCUMENT CONSTRUCTION

FIELD OF THE INVENTION

The present invention relates to the field of generating reusable document components (RDCs) and reusable underlays (RULs) in document rendering and, more particularly to methods for generating, caching, and using composite RDCs and RULs in systems which merge variable document data into static components.

BACKGROUND OF THE INVENTION

Personalized print jobs contain both variable and reusable types of data. Variable data is typically printed on a form that remains static from page to page while the variable data itself is different on each form. Reusable data (reusable document components, or RDCs) appears multiple times within the same page, on different pages of the same job, or between different jobs.

A form, for instance, in a variable data job is considered to be a RDC. A form is also referred to as a reusable underlay (RUL) given the attribute that it matches the size of the page to be printed. The form is static because it is printed each time a completed form is printed. However, the information entered into the electronic form is variable content, which will typically differ for each person's completed form. Another example of a print job containing a mixture of variable and static content is a business letter with a standardized letterhead that is printed as part of the letter. The letterhead is static content across business letters, whereas the text of each letter is variable content. Similarly, in high print volume personalized advertising for mailing to customers or other large groups, the basic content is static while certain portions of the advertising are personalized based on information extracted from a customer database.

If cached, the cached RDCs will be used rather than re-rendering the component for the page. A given page can have more than one RDC placed on it. Pages that have multiple RDCs currently require each RDC retrieved from the cache and merged to construct the page output. Merging the multiple RDCs along with the non-cached elements of the page is time consuming and lowers the page per minute throughput of the print path.

What is needed in the art is a system and method that renders and caches composite RDCs and composite RULs as they are interpreted for pages of a job.

BRIEF SUMMARY

What is disclosed is a method for creating reusable composite components from interpreted pages of a rendered document during dynamic document construction. The method involves first obtaining a list of document components from the page and identifying any non-cached components. The individual reusable document components (RDCs) are cached having been rendered to their respective bounding box dimensions. These RDCs are then permuted into combinations of RDCs and each composite RDC is cached rendered relative to each other in a bounding box of sufficient size to adequately contain the combination. Then, combining RDCs to form composite RULs and caching the composite RULs rendered to full-page size. Any portion of each RDC of each composite RUL falling outside the boundary of RULs full-page size is clipped.

Also disclosed is a method for rendering pages having a combination of reusable components and non-cached components as the first step of assessing the page for the possibility of having an underlay-overlay pair. Then a cache of RULs is searched for underlays having the needed RDCs. If a matching RUL is not found in the cache then a new full page size RUL is created and cached. If a RUL is found or cached then a full-page size overlay is created from the non-cached components of the page. Lastly, the pages underlay (RUL) and overlay are used to render the page therefrom.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE SPECIFICATION

An appendix entitled: "PDSImager Design Specification to Support VIPP and DocuSP3.5", is attached hereto providing source code and other details in order to enable one skilled in this art to implement without undue experimentation the techniques of the present invention described herein.

Figure 1:
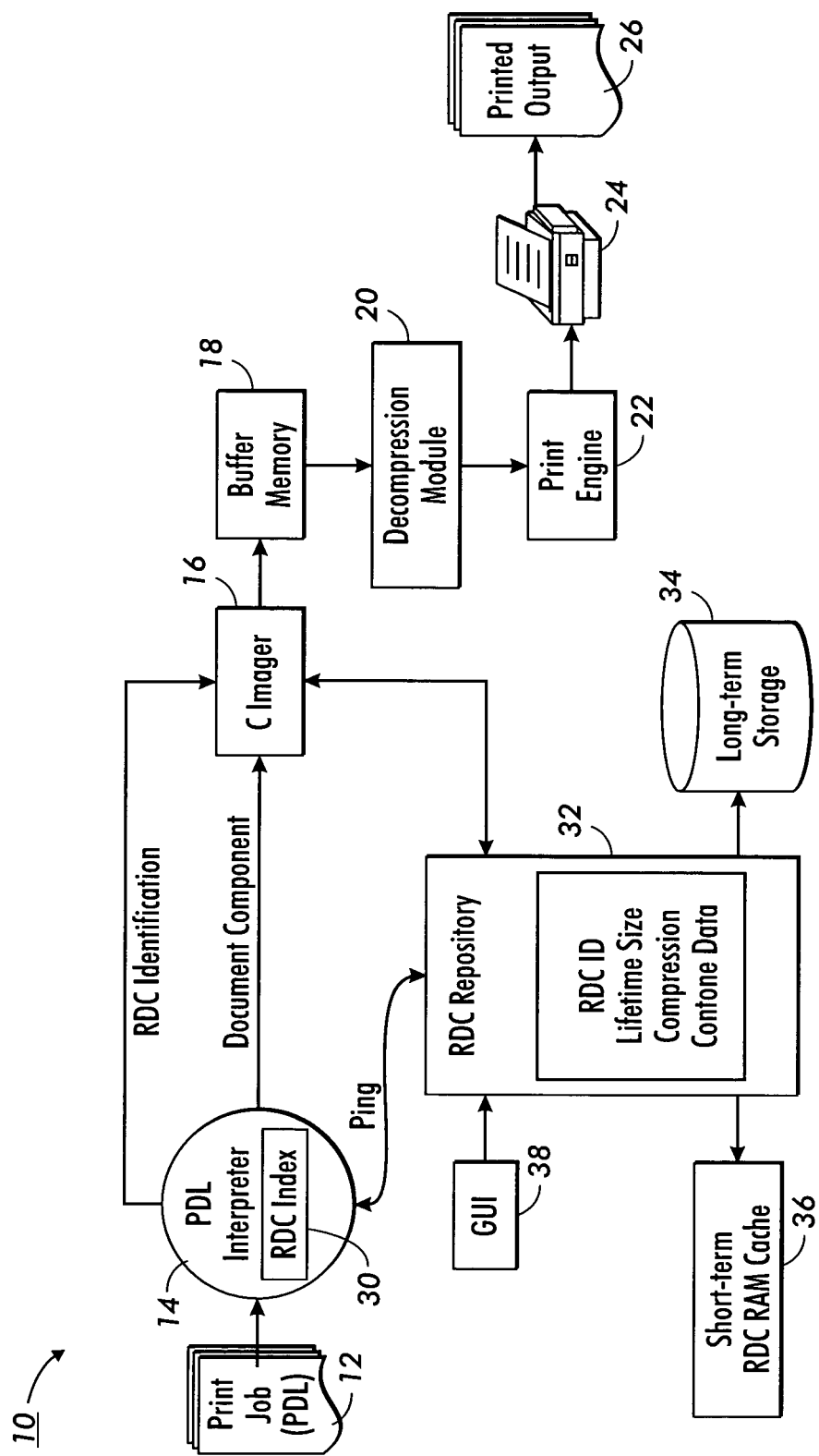
FIG. 1 illustrates an apparatus embodiment of the invention for performing document construction.

With reference to FIG. 1, an exemplary apparatus 10 for performing document construction receives a document description 12 describing a print job, an electronic document, or the like. The document description 12 is preferably encoded in a page description language (PDL) representation such as a Variable data Intelligent Postscript Printware language (VIPP) or a Personalized Print Markup Language (PPML) based upon the Extensible Markup Language (XML) standard. The PDL specification includes at least one reuse hint that indicates a selected document component is a reusable document component (RDC).

A PDL such as VIPP can describe imaging resources potentially reused and advantaged if cached. The resources, in their cached form, are named "Reusable Document Components", or RDCs. A reusable component that is the same size as the page being rendered or displayed is called a "Reusable UnderLay" or RUL.

A VIPP page (a page from a VIPP job) can be comprised of cacheable RDCs and non-cached components. The cacheable RDCs can potentially be used on each or many of the following VIPP pages. The system renders and caches RDCs. When used on a page the RDCs can be retrieved from the cache and merged with the non-cached elements. A list of the RDCs and the non-cached elements for the page is built along with position information and used when merging the components for the final page output.

In general, document description 12 is processed by a PDL interpreter 14 that processes document portions or components. Typically, a document component is forwarded to a Compressor-Imager 16 that rasterizes the image into one or more pixel maps and compresses the pixel maps to reduce memory usage prior to printing. For color document components, the pixel maps are preferably continuous tone (contone) pixel maps. For black-and-white document components bit maps or half-tone pixel maps are preferred. Imager 16 constructs rasterized document pages from the document components. A buffer memory 18 accumulates rasterized document pages as they are constructed. The rasterized document pages are subsequently processed by a decompression module 20 that expands the compressed pixel maps. The resulting uncompressed rasterized document pages are forwarded to a print engine 22 that processes the pixel maps and controls a printing device 24 to produce document 26.

Instead of producing a printed document, the compressed pixel maps or document pages can alternatively or additionally be processed and used in other ways, such as being stored on a magnetic or optical disk for electronic viewing over a local network or over the Internet, transmitted via electronic mail, imported into another document or application, or the like.

The VIPP-2001 or other PDLs in which the document description 12 is encoded support reusable document hints that enable reuse of document components, which are rendered multiple times within a single document. These hints can be applied by the generating application to promote reuse of document components both within a selected document and also across documents.

When the PDL interpreter 14 encounters a reusable document hint in the document description 12, the PDL interpreter 14 references an internal state, such as a RDC index 30, to determine whether or not the document component corresponding to the hint has previously been rasterized and stored in Repository 32 which includes RDCs accumulated during past processing of other documents as well as RDCs generated as the present print job 12 is processed.

If the PDL interpreter 12 locates an RDC identification in the RDC index 30 that corresponds to the document component with the hint, the PDL interpreter communicates with the RDC repository to: (1) verify that the RDC is still contained in the RDC repository; and (2) command the RDC repository to preserve the RDC until it is accessed. The PDL interpreter also sends the RDC identification to Imager 16 rather than sending the actual document component. Imager 16 receives the RDC identification and communicates with the RDC repository to retrieve the corresponding compressed pixel map which is then stored in memory 18 and further processed substantially similarly to the processing of ordinary (i.e., not reusable) document components.

If, however, the PDL interpreter does not locate the document component with the hint in the RDC index, it communicates both the document component and an RDC identification to the Imager which processes the document component to generate a compressed pixel map to be stored in memory. The Imager additionally sends the compressed pixel map along with the RDC identification to the RDC repository 32 for possible reuse. The RDC is stored in the RDC repository as a compressed pixel map (e.g., compressed contone data for typical color document components). Along with the compressed pixel map, the RDC repository preferably stores selected additional information pertaining to the RDC such as a compression mode, an RDC size, the RDC identification, and a lifetime parameter.

The lifetime parameter indicates how long the RDC repository should store the RDC. The lifetime is determined by the PDL interpreter 14 and communicated along with the RDC identification to the Imager 16, which then forwards the lifetime to the RDC repository 32. The lifetime can correspond to a lifetime indicated along with the reuse hint in the document description 12. Alternatively, the lifetime is selected by the PDL interpreter 14 based on the type of RDC, the nature of the document description 12, parameters of the corresponding print job, or similar information. The lifetime may be set to the termination of the present print job described by the document description or alternatively set to 'permanent' indicating that the RDC should not be deleted except by an express command of a user.

The RDCs of the RDC repository are stored in a long-term non-volatile storage 34 and/or a short-term RDC memory cache 36 associated with the repository. Preferably, a user can manage the RDC repository including storage 34, 36 via GUI 38. Optionally, the RDC repository also performs RAM cache cleanup when the cache is close to capacity to remove those RDCs that have not been accessed recently. The cleanup frees up space in the cache for RDCs which are currently being frequently accessed while relegating less-frequently accessed RDCs to longer term storage 34. Optionally, the RDC repository references the lifetime parameter associated with a RDC to perform automated deletions of RDCs from the RAM 36, and also from storage 34.

Figure 2:
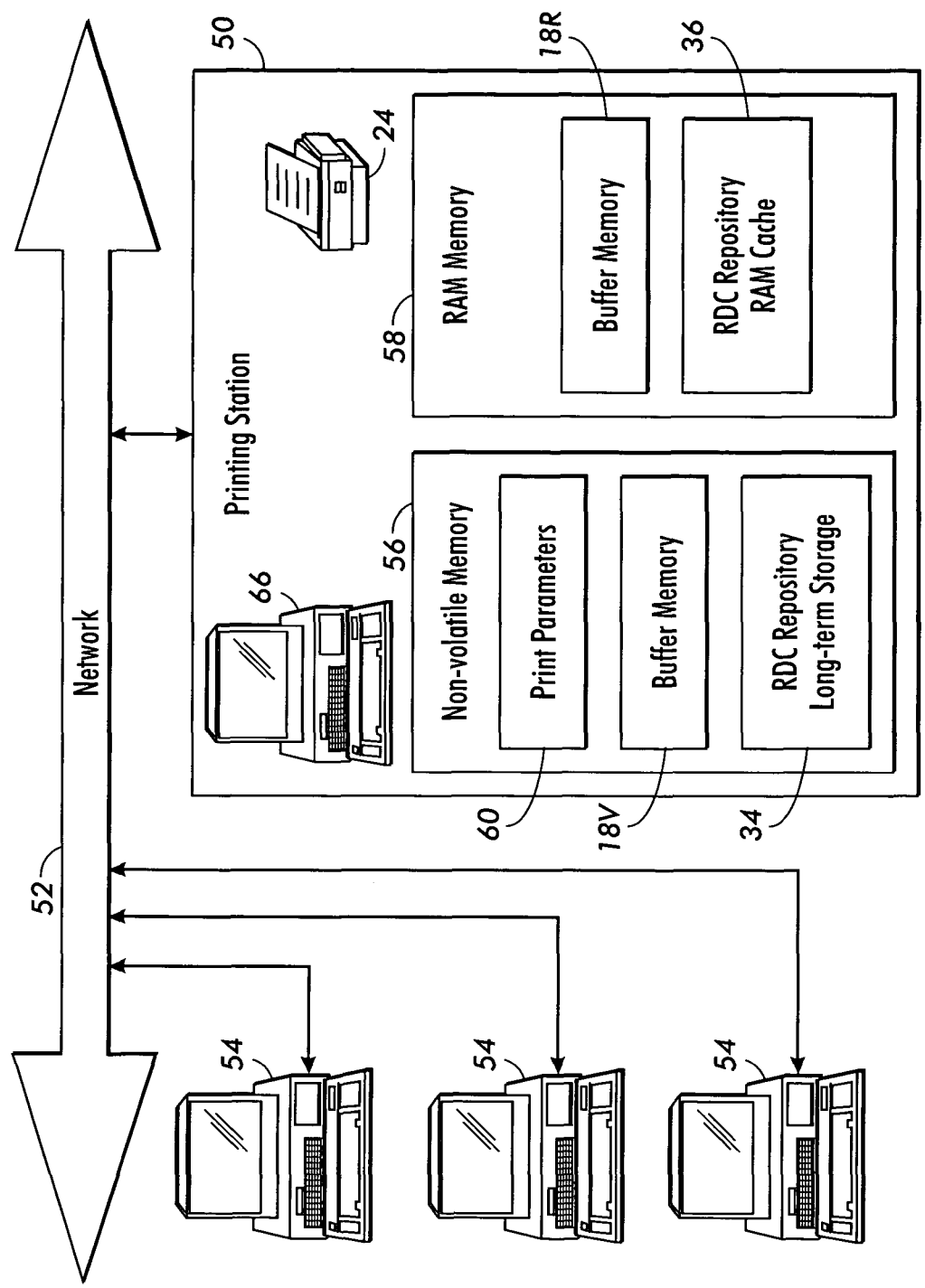
FIG. 2 illustrates an exemplary integration of the apparatus of FIG. 1 into a network-based printing station.

With continuing reference to FIG. 1 and with further reference to FIG. 2, apparatus 10 is integrated into printing station 50 connected with network 52 that includes computers 54. Printing station 50 receives print jobs such as the exemplary document description 12 via network 52.

The memories 34, 36 are suitably embodied as allocated portions of general-purpose memory 56 and RAM 58, respectively, of printing station 50. Memories 56, 58 also store information such as printing parameters 60 for the printing station and buffer memory 18 (FIG. 2 as memories 18V, 18R). Memories 34, 36 are allocated to the RDC repository or is optionally user adjustable through GUI 38 embodied on PC 66.

Other elements of apparatus 10 in FIG. 1, such as the PDL interpreter 14, the Imager 16, decompression module 20, and print engine 22, are also integrated into the printing station; not shown in FIG. 2.

How an RDC Repository Works

Figure 3:
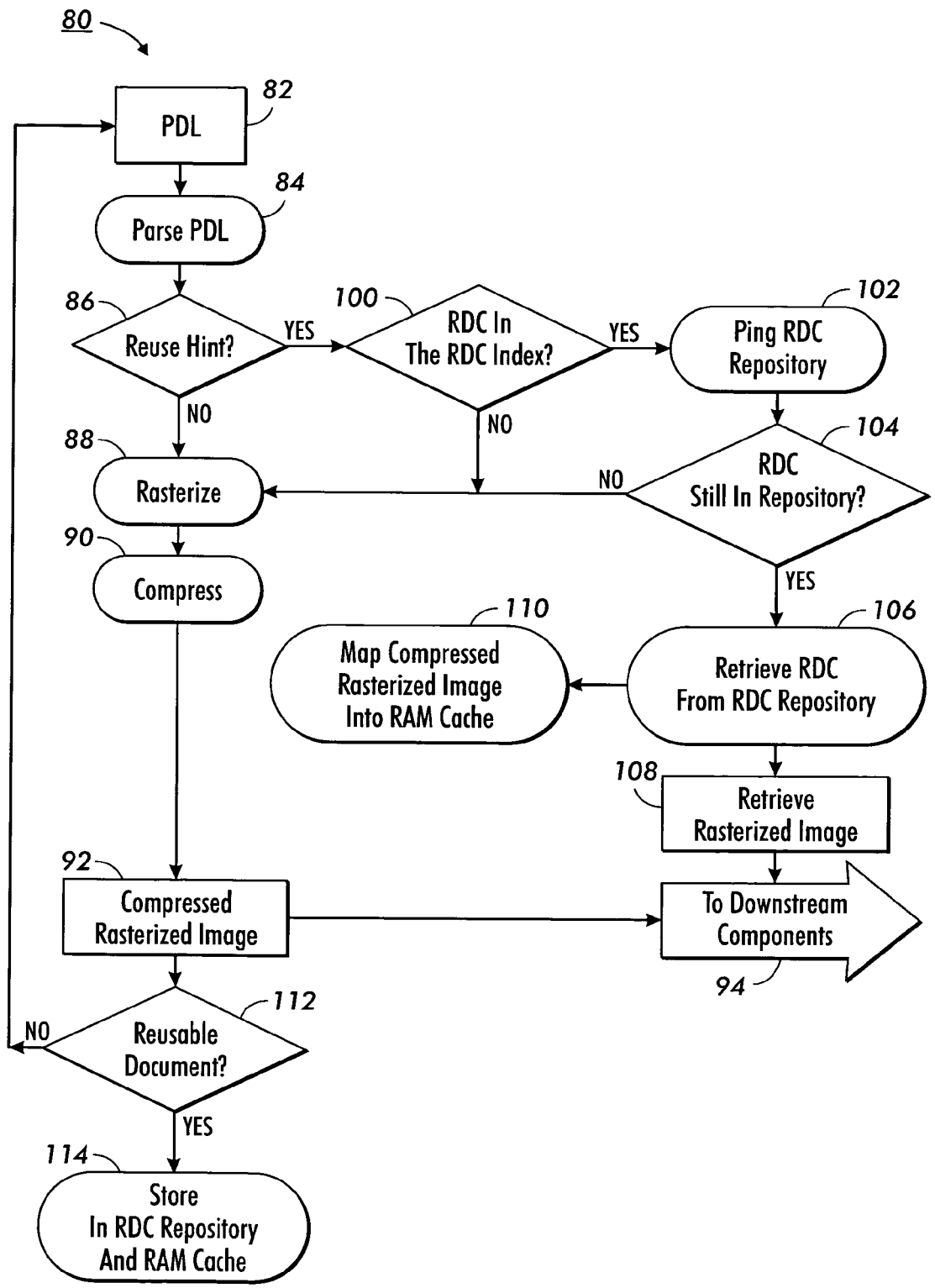
FIG. 3 illustrates a flow chart of a method of how an RDC Repository works.

With reference to FIG. 3, a method 80 for employing the RDC repository 32 during document construction is described. PDL document 82 is examined in parsing step 84 to identify document components for rasterization. Each document component is checked 86 to determine whether the document component has a reuse hint associated therewith. If there is no reuse hint then that component is rasterized 88 and compressed 90 to produce component 92. If, however, decision 86 finds that a reuse hint. the PDL interpreter checks RDC index 30 in step 100 to determine whether the RDC has been previously encountered and whether a corresponding pixel map is presently stored in the RDC repository. If the RDC has been encountered previously, the PDL interpreter pings the RDC repository in step 102 in order to verify that the pixel map is still in the RDC repository. At decision 104 the PDL interpreter decides how to proceed based upon a response of the RDC repository. If the RDC repository locates a corresponding pixel map it marks it as read-only and communicates a confirmation to the PDL interpreter that the pixel map is available. In this case, retrieval 106 is performed to retrieve the corresponding compressed pixel map 108 from the RDC repository. If the retrieval was from storage 34, the RDC (which is now the most recently used RDC) is mapped into cache in step 110. The retrieved compressed pixel map 108 is sent to downstream components 94 in substantially the same manner as if the Imager 16 had just generated it. If, however, decision step 100 finds that the RDC is not indexed in the RDC index 30, or if the decision step 104 finds that the pixel map corresponding to the RDC is no longer in the RDC repository then steps 88 and 90 are performed. The resulting compressed pixel map 92 is communicated to the downstream components 94.

Additionally, however, if at decision 112 it is recognized that the newly created pixel map corresponds to a reusable document component then in 114 the created pixel map 92 is communicated to the RDC repository to be stored in storage 34. Since this newly created RDC is also the most recently used RDC, it is preferably mapped into the cache 36. If the RDC has a short lifetime, e.g., limited to the present print job, the RDC is optionally placed in the cache only and not stored.

Composite RDCs and RULs

A composite RDC is an RDC made up of multiple RDCs in order to provide improved performance whereby the final page is a merging of fewer components, the non-cached components and the composite. A composite RDC is reused if the same component combination and same relative positions is found on a subsequent page.

What follows is an example of how composite RDCs and RULs are created given some made up page PDL scenario involving multiple reusable components (RDCs).

Figure 4:
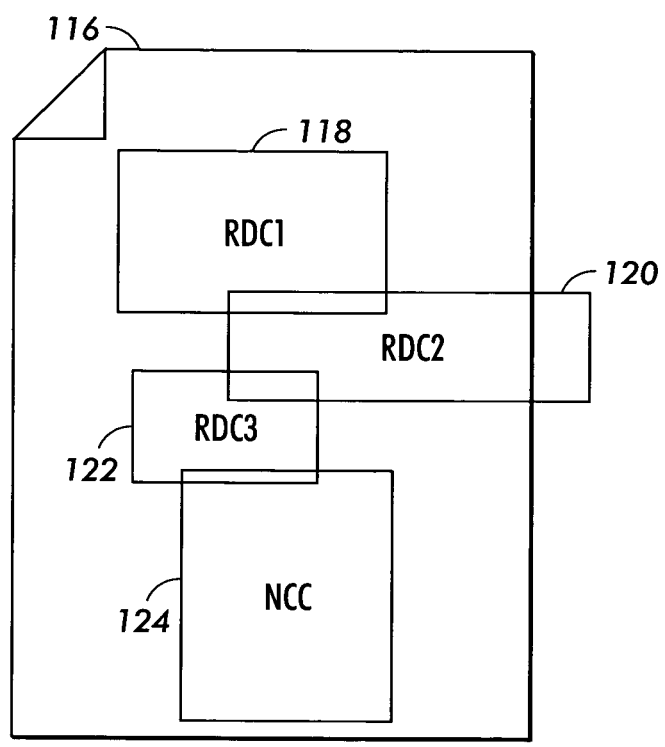
FIG. 4 shows a fully constructed page with its RDCs and non-cached components from which the RDC composites are derived in accordance with the method of the present invention.

Attention is now directed to FIG. 4. A composite RDC is created from the RDCs in the component list of page PDL 116 as it is interpreted to have the following RDCs and non-cached components: RDC1 at 118 with BBox1 at position X1, Y1; RDC2 at 120 with BBox2 at X2, Y2; RDC3 at 122 with BBox3 at X3, Y3; and non-cached components (NCC) at 124.

Figure 5:
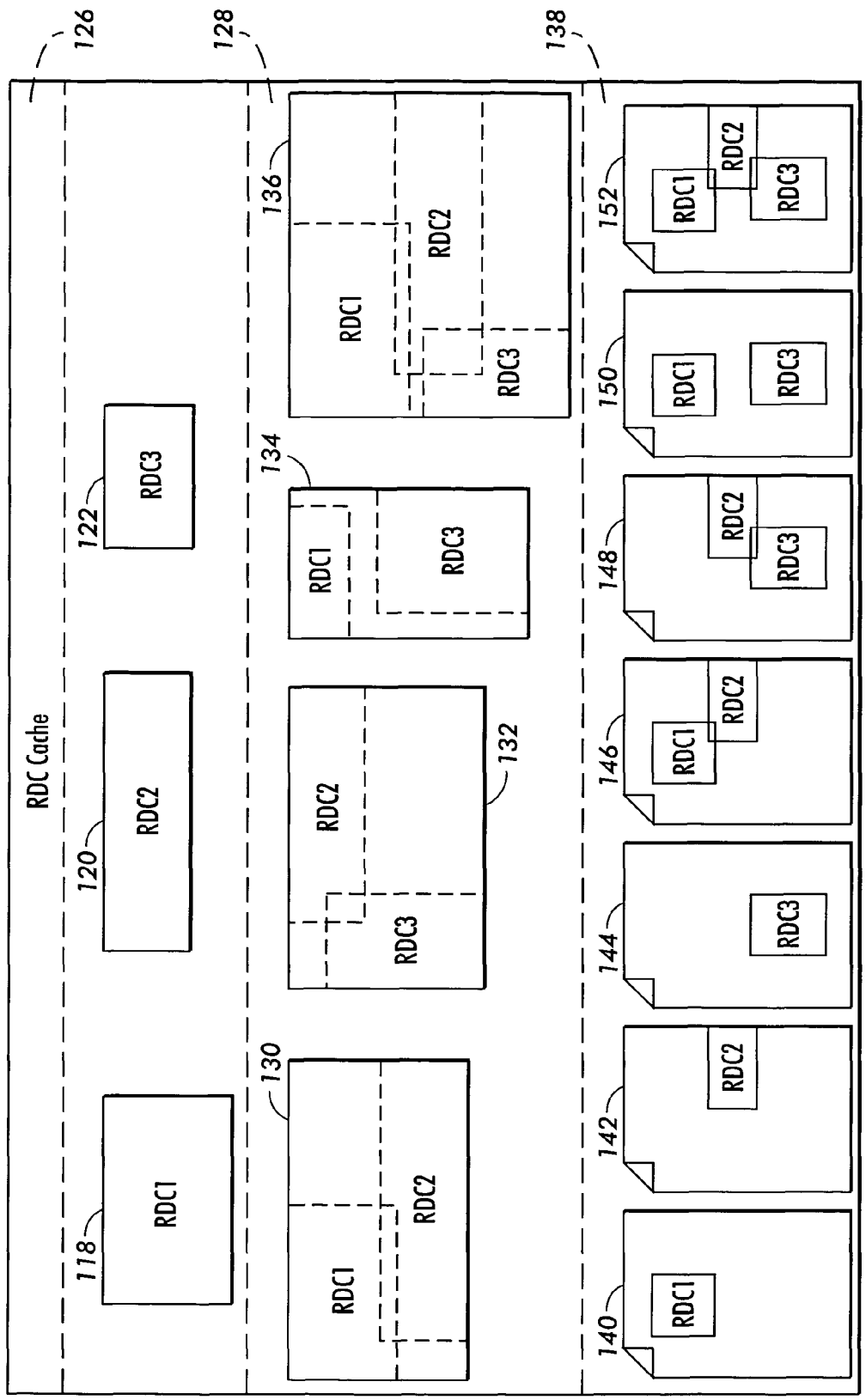
FIG. 5 shows the RDC cache and the composite RDCs and RULs generated from the components of the page of FIG. 4.

With reference being made to FIG. 5, the resulting RDC cache 126 derived from page PDL 116 of FIG. 4 at the time the RDC combination is first rendered are shown. Stored in cache 126 are RDCs 118, 120, and 122 of FIG. 4 rendered to their respective bounding box (BBox) dimensions. Single RDCs are cached in a size defined by the VIPP.

Also stored in cache are the composite RDCs, shown collectively at 128, rendered to their relative positions. Cached combination RDC1, RDC2, at 130, is stored rendered relative to each other into a BBox having a size, which can adequately contain this combination. Cached combination RDC2, RDC3, at 132, is stored rendered relative to each other into a BBox having a size, which contains this combination. Cached combination RDC1, RDC3, at 134, is stored relative to each other into a BBox containing this pair. Lastly, the combination RDC1, RDC2, and RDC3, at 136, is stored rendered relative to each other into a BBox that can contain these three.

A combination of RDCs is also preferably combined in their relative positions to form a composite RUL, shown collectively at 138 of FIG. 5. Caching RDCs as composite RULs allows subsequent pages that use the RDCs in the same placement to render non-cached components of the page as an overlay. A composite RUL is a RUL made up of multiple RDCs and/or multiple RULs. A composite RULs is a variant of a composite RDC in that the composite RUL is created to provide a faster page rate given the Imager's ability to create overlay output from the non-cached elements of a page and the marker/print path's ability to merge underlays and overlays on the fly. The composite RULs rendered to full-page size are shown at 140 through 152. Note that RDC2, at 120 of FIG. 4, is clipped in composite RULs 142, 146, 148, and 152 because a composite RUL is specifically created to have the size of the page being rendered. Thus, any part of any RDC falling outside the page boundaries is subsequently clipped.

Figure 6:
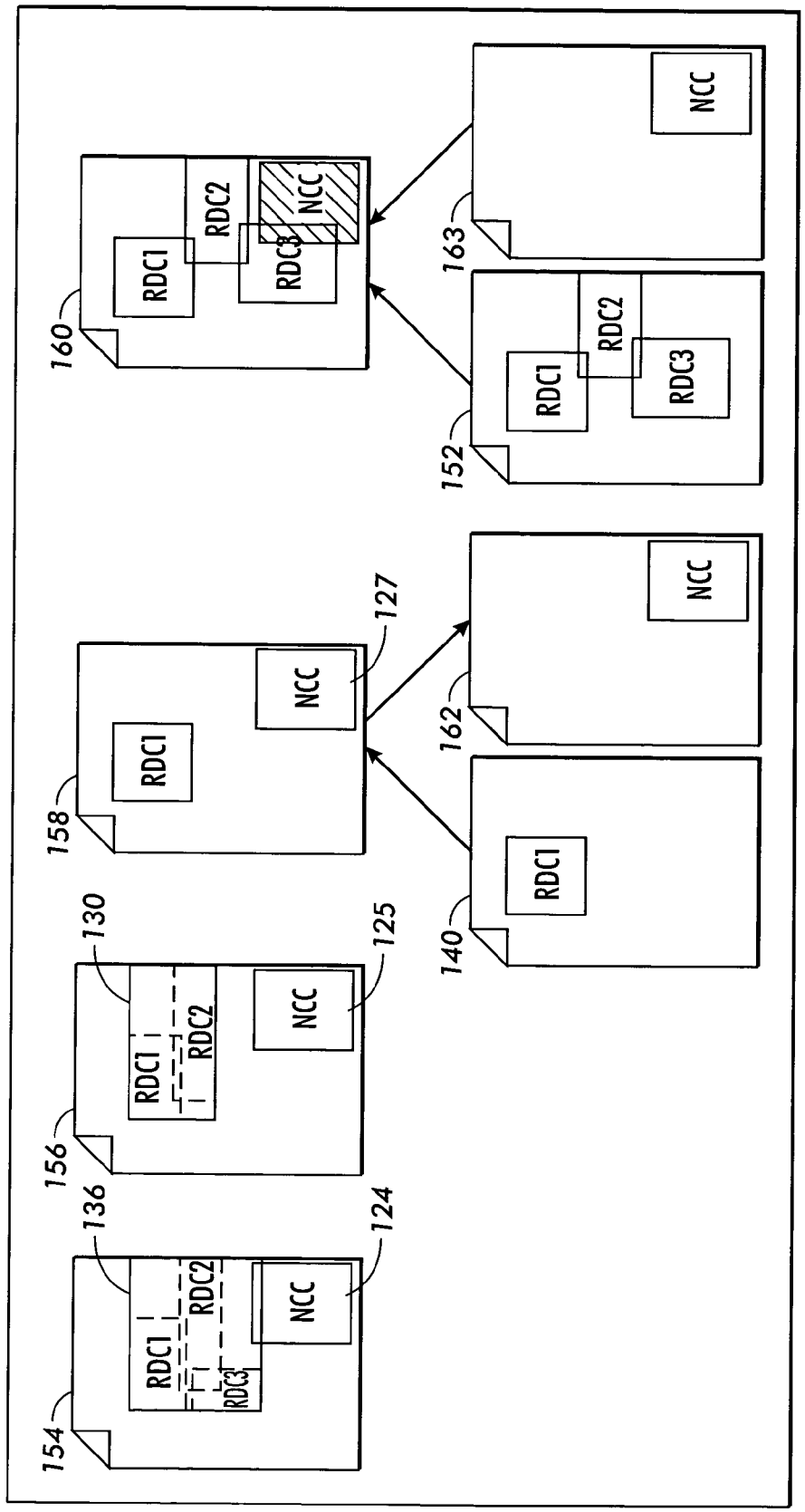
FIG. 6 illustrates how the cached composites of FIG. 5 are used to render subsequent pages.

Attention is now directed to FIG. 6, which illustrates how the cached composites of FIG. 5 are used to render subsequent pages. Page 154 requires cached RDC Composite 136 and non-cached components 124 of page 116 of FIG. 4. Subsequently rendered page 156 requires cached RDC Composite 130 and non-cached components 124. Page 158 requires RDC component 118 and NCC 124. However, as many VIPP print jobs are created having the same combinations of RDCs repeated from page to page, the RDC composite that combines all of the RDCs into a composite RUL (rather than the lesser perturbations of RDCs) provide a performance boost because the composite RULs allow these repeated page types to become underlay-overlay pairs. As such, rendered page 158 is itself assessed for the possibility of generating an underlay-overlay pair. Since underlay 140 is already cached, in 138 of FIG. 5, the non-cached component is turned into overlay 162 and cached. Page 160 utilizes cached overlay 152 and overlay 163.

Figure 7:
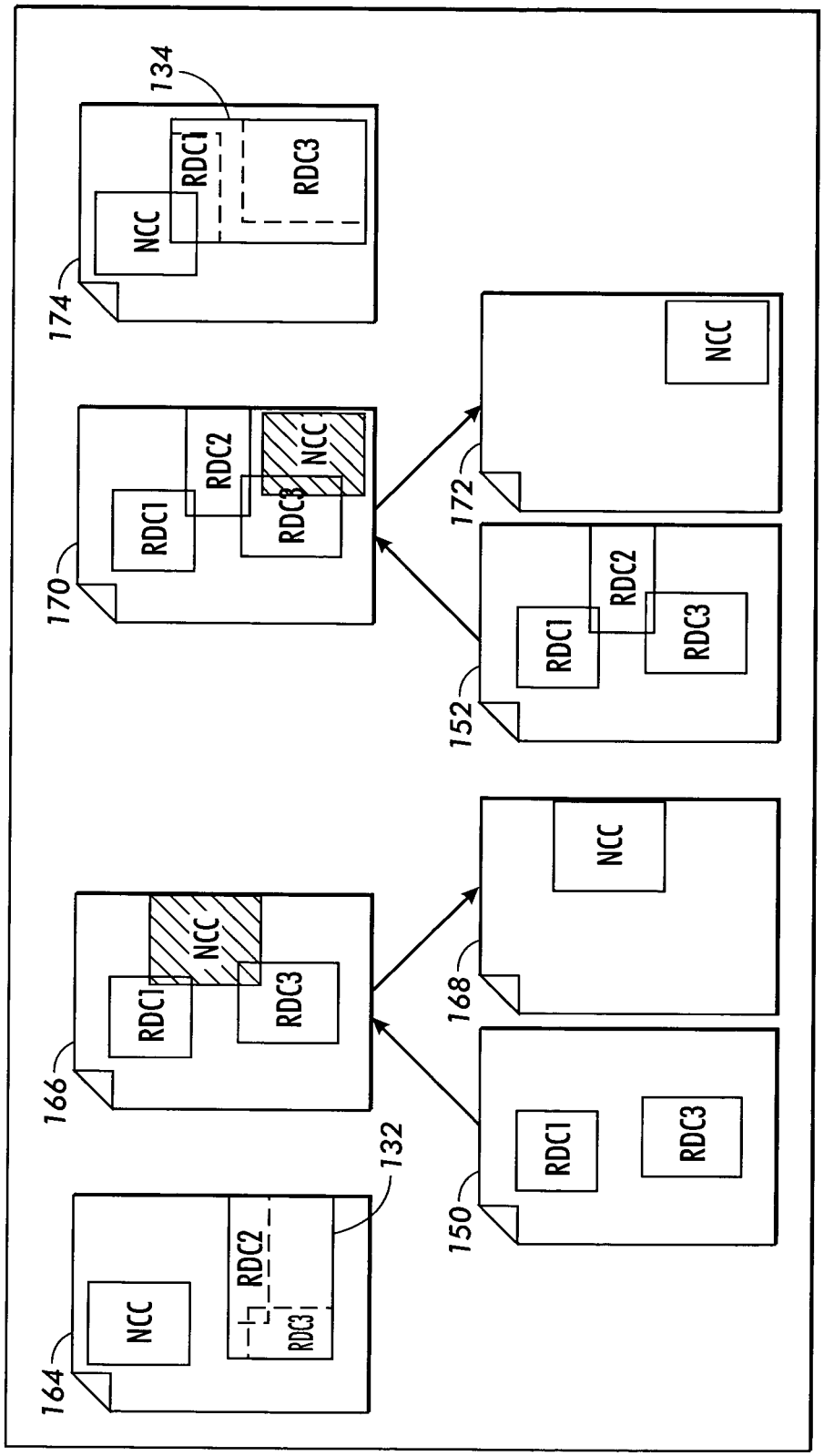
FIG. 7 illustrates the rendering of subsequent pages in furtherance to FIG. 6.

With reference now being made to FIG. 7, if a following page is assessed to have an RDC combination that has a cached composite RUL for the needed RDCs, the non-cached components for the page are also preferably turned into an overlay. This allows a performance boost in that non-cached components alone tend not to take long to render and no combining is needed in the rendering stage. As with the RDCs, the combining is moved to a later display or print stage and, if the data format of the underlay and overlay allow easy merging and both components are the same size, combining can be done at a high rate.

Thus, page 164 of FIG. 7 merges cached RDC Composite 132 with the non-cached component (NCC). Page 166 uses underlay 150 with non-cached objects as an overlay 168. Page 170 uses underlay 152 with non-cached objects as an overlay 172. Page 174 merges cached RDC composite 134 with the non-cached component (NCC).

What is claimed is:

1. A document construction method comprising:
    receiving a document description including at least one selected reusable document component and combining some of the reusable document components into composites of reusable document components and combining some of the reusable document components with respect to the relative positions of the reusable document components into composites of reusable underlays;
    querying a reusable document component repository containing stored image representations of reusable document components to locate a selected stored image representation corresponding to the selected reusable document component;
    conditional upon the querying, identifying one of the stored image representations as corresponding to the selected reusable document component and retrieving the selected stored image representation corresponding to the selected reusable document component;
    conditional upon the querying, not identifying one of the stored image representations as corresponding to the selected reusable document component, generating an image representation for the selected reusable document component, and storing the generated image representation in the reusable document component repository and associating a life span parameter with the generated image representation;

converting the document description to a document image representation, the converting including incorporating the selected or generated image representation corresponding to the selected reusable document into the document image representation; and responsive to an expiration of the life span parameter, removing the corresponding generated image representation from the reusable document component repository.

2. The document construction method as in claim 1, wherein the step of associating a life span parameter with the generated rasterized image includes associating one of a temporal life span and an indication of permanence with the generated image representation.

3. The document construction method as in claim 1, wherein the life span parameter is such that the generated image representation remains available in the reusable document component repository for reuse in the construction of subsequent documents.

4. The document construction method as in claim 1, wherein the querying includes tracking previously generated image representations; and conditional upon the tracking indicating that a previously generated image representation corresponds to the selected reusable document component, verifying the previously generated image representation currently resides in the reusable document component repository.

5. The document construction method as in claim 4, wherein the querying further includes conditional upon a successful verifying, marking the previously generated image representation to prevent a removing thereof.

6. The document construction method as in claim 1, wherein the storing of the generated image representation in the reusable document component repository includes, prior to the storing, compressing the image.

7. The document construction method as in claim 1, further comprising storing at least a portion of the reusable document component repository in a random access memory cache.

8. The document construction method as in claim 1, further comprising storing the reusable document component repository on a permanent storage device; and storing most recently accessed image representations in a random access memory cache.

9. The document construction method as in claim 1, further comprising identifying the selected reusable document component as reusable by detecting a reusable document component hint associated with the reusable document component.

10. The document construction method as in claim 9, wherein the document description is encoded in a Variable data Intelligent Postscript Printware language.

11. The document construction method as in claim 9, wherein the document description is encoded in a Personalized Print Markup Language.

* * * * *